United States Patent
Soliman

(10) Patent No.: US 7,680,497 B2
(45) Date of Patent: Mar. 16, 2010

(54) METHOD AND SYSTEM FOR OPTIMIZING SYSTEM-ACCESS AND SOFT-HANDOFF PARAMETERS BASED ON LOCATION INFORMATION

(75) Inventor: Samir S. Soliman, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 2067 days.

(21) Appl. No.: 09/965,187

(22) Filed: Sep. 25, 2001

(65) Prior Publication Data

US 2003/0060201 A1 Mar. 27, 2003

(51) Int. Cl.
*H04W 36/00* (2006.01)
*H04W 4/00* (2006.01)

(52) U.S. Cl. ............ 455/442; 455/436; 455/435.1
(58) Field of Classification Search ......... 455/442, 455/441, 456.3, 452.1, 456.1, 456.5; 370/331, 370/335, 310.2
See application file for complete search history.

(56) References Cited

U.S. PATENT DOCUMENTS

| | | | |
|---|---|---|---|
| 5,945,948 A * | 8/1999 | Buford et al. ............ 342/457 |
| 6,141,565 A | 10/2000 | Feuerstein et al. | |
| 6,249,252 B1 | 6/2001 | Dupray | |
| 6,477,379 B2 * | 11/2002 | Kingdon ................ 455/456.1 |
| 6,507,740 B2 * | 1/2003 | Shi ........................ 455/437 |
| 6,594,243 B1 * | 7/2003 | Huang et al. ............. 370/332 |
| 6,597,673 B1 * | 7/2003 | Nobuyasu et al. ........ 370/331 |
| 6,611,688 B1 * | 8/2003 | Raith ...................... 340/992 |
| 6,934,546 B1 * | 8/2005 | Corbett et al. ........... 455/441 |
| 2001/0022558 A1 | 9/2001 | Karr, Jr. et al. | |
| 2002/0077103 A1 * | 6/2002 | Bonta .................... 455/436 |

FOREIGN PATENT DOCUMENTS

| | | |
|---|---|---|
| EP | 1107630 | 6/2001 |
| GB | 2271486 | 4/1994 |
| WO | 0163960 | 8/2001 |

OTHER PUBLICATIONS

International Search Report—PCT/US02/29894—International Search Authority—European Patent Office—Apr. 7, 2003.
European Search Report—EP07009997—European Search Authority—Munich—Jun. 25, 2007.

* cited by examiner

*Primary Examiner*—Melur Ramakrishnaiah
(74) *Attorney, Agent, or Firm*—Abdollah Katbab; Kam T. Tam

(57) ABSTRACT

A system and method for updating a current set of parameters in a communications system is provided. The system and method determines the current position of a mobile unit in a first coverage area, determines a set of optimum parameters based on the current position of the mobile unit, and updates the current set of parameters in the mobile unit with the set of optimum parameters. The system and method may be used for optimizing position-dependent system-access and soft-handoff parameters.

25 Claims, 6 Drawing Sheets

METHOD AND SYSTEM FOR OPTIMIZING SYSTEM-ACCESS AND SOFT-HANDOFF PARAMETERS BASED ON LOCATION INFORMATION

BACKGROUND

1. Field

The present invention relates generally to communications systems, and more specifically to systems and methods for optimizing soft handoff and system access parameters in telecommunications systems.

2. Background

Cellular telecommunications systems are characterized by a plurality of mobile units (e.g. cellular telephones) in communication with one or more base stations. Signals transmitted by a mobile unit are received by a base station and often relayed to a mobile switching center (MSC). The MSC in turn routes the signals to a public switched telephone network (PSTN) or to another mobile unit. Similarly, a signal may be transmitted from the PSTN to the mobile unit via the base station and the MSC.

Each base station covers a "cell" within which a mobile unit may communicate. The cell covers a limited geographic area, wherein calls from mobile units are routed to and from a telecommunications network via the MSC. The coverage area of a typical cellular telecommunications system may be divided into several cells. Each cell may also be divided into several sectors. Different communications resources are often allocated to each cell or sector to maximize communications system resources. When a mobile unit moves from a first cell to a second cell, or from a first sector to a second sector, a handoff has to be performed to assign new system resources associated with the second cell or sector.

A handoff involves executing a set of negotiations between the mobile unit and one or more governing base stations and/or MSCs. Handoff improves the performance of the system at the expense of more system resource. Efficient and timely handoff procedures are becoming increasingly important as smaller cells and/or sectors are deployed to meet demands for increased communications system capacity. Use of smaller cells and/or sectors increases the number of boundary crossings and resource assignments, thereby increasing the need for adaptive, efficient, fast, and cost-effective handoff procedures.

Handoff can be classified as hard handoff or soft handoff. Hard handoff procedures are used to transfer an ongoing call between adjacent cells or sectors, having different frequency assignments, having different radio configurations as in the case of third generation wireless systems (3G), having different frame offsets, or even between systems such as handoff between code division multiple access (CDMA) and analog (AMPS). In a hard handoff, a first link with a first cell is broken and then a second link is established. In a soft handoff, a first link is maintained until a second link is established. Thus, there is a time during which the first link and second link are maintained simultaneously. In either the case, a large delay between the dropping of the first link and the establishment of the second link may result in unacceptable communications service quality.

Access handoff is another feature of 3G systems. Due to the rapid change in the dynamics of the radio frequency (RF) channel, the control (paging) channel may not be in soft handoff when the traffic channel is assigned, and the mobile station may not be monitoring the best cell when it receives a page. Consequently, the performance of the phone while operating in system access state is vulnerable. To enhance the performance of the system while the mobile station is in the system-access state, some techniques have been proposed. These techniques include access entry handoff, channel assignment into soft handoff, access handoff, and access probe handoff.

In processing a handoff, a mobile unit uses various static handoff parameters, which may have been sent over the air and stored by the mobile unit. One problem with using static handoff parameters is that the mobile unit has to use the same static parameters for all geographical areas, irrespective of terrain, morphology, traffic density of cell sites and/or sectors, and other land characteristics. Consequently, handoffs based on static handoff parameters are not adaptable to various geographical locations, may consume more system resources, and may result in poor communications service performance.

There is a need, therefore, for an adaptive, fast, efficient and cost-effective method and system for facilitating reliable system access and soft handoff in a cellular telecommunications system with optimized parameters based on location information.

SUMMARY

According to one aspect of the present invention, a wireless communication system includes a first transceiver, a second transceiver, and a third transceiver that may be in communication with the first transceiver. The system may effectuate a soft handoff from the first transceiver to the second transceiver using a set of optimum system and soft handoff parameters that may be determined based on the current position of the third transceiver.

According to another aspect of the present invention, a mobile unit may include hardware and software means for receiving a set of optimum system-access parameters, which may be determined based on the current position of the mobile unit, for controlling the performance of the mobile unit. Controlling the performance may include effectuating a soft handoff from a first base station to a second base station using the set of optimum soft handoff parameters that may be received as part of the optimum system-access parameters.

According to another aspect of the present invention, a base station may include hardware and software means for transmitting a set of optimum system-access parameters, which may be determined based on the current position of a mobile unit in a first coverage area, for controlling the performance of the mobile unit. Controlling the performance may include effectuating the initial open loop power, persistence delay, power increment, randomization delay, back off time, and acknowledgement timeout. These parameters may be used by the mobile station to access the system and may be sent as part of the access parameters message on the common or dedicated signaling channels. According to another aspect of the present invention, a method for updating a current set of system parameters in a communications system may include determining the current position of a mobile unit in a first coverage area, determining a set of optimum parameters based on the current position of the mobile unit, and updating the current set of parameters with the set of optimum parameters. The method may be applied to optimizing position-dependent parameters that may be involved in system-access and/or soft handoff.

According to another aspect of the present invention, a method and system for dynamically updates a current set of system parameters in a communications system based on the recent performance of mobile stations just traversed a given geographical areas. For example, an intelligent system may deduce that a mobile station that traveled the same route sometime ago went through unnecessary handoff that could have been avoided without major degradation in system's performance. The intelligent system may also deduce that the mobile station at the same neighborhood accessed the system with much higher and unnecessary transmit power based on open loop calculations, hence the mobile unit under consideration may use less initial power for accessing the system.

According to another aspect of the present invention, a method and system restricts mobility of a mobile unit in a telecommunication system. The method includes determining the current position of a mobile unit in a first coverage area, determining a set of parameters based on the current position of the mobile unit, and preventing the mobile unit from performing or from establishing a communication access based on the set of parameters if the current position is in a restricted zone.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

A base station may transmit and receive data packets through one or more BSC, and may transport data packets between multiple mobile units. The base station may be further connected to additional networks outside the base station, such as a corporate intranet or the Internet, and may transport data packets between each mobile unit and such outside networks. A mobile unit that has established an active traffic channel connection with one or base stations is called an active mobile unit, and is said to be in a traffic state. A mobile unit that is in the process of establishing an active traffic channel connection with one or more base stations is said to be in a connection setup state. A mobile unit may be any data device that communicates through a wireless channel or through a wired channel, for example using fiber optic or coaxial cables. A mobile unit may further be any one of a number of types of devices including but not limited to PC card, compact flash, external or internal modem, or wireless or wire-line phone. The communication link through which the mobile unit sends signals to the base station is called a reverse link. The communication link through which a base station sends signals to a mobile unit is called a forward link.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
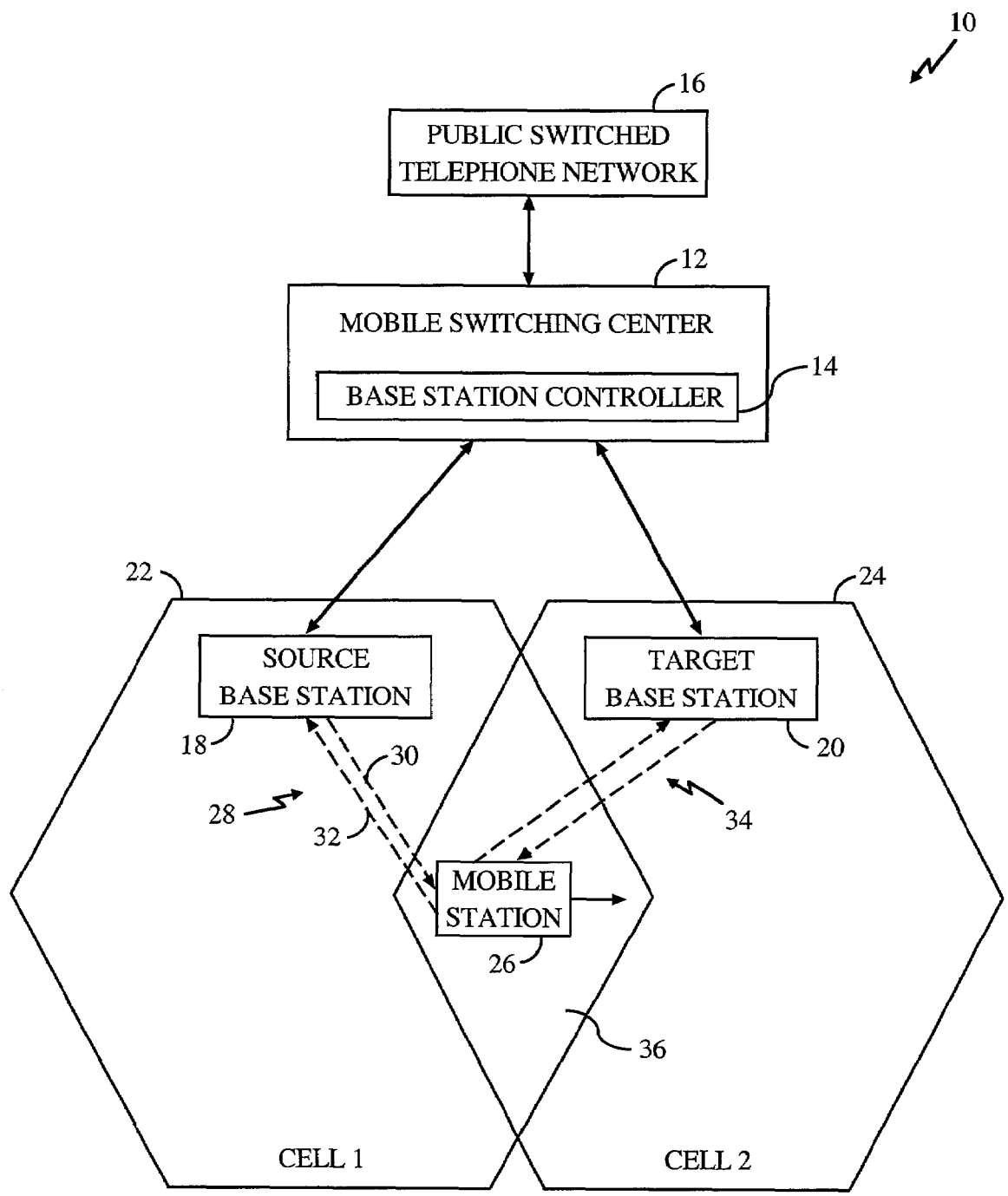
FIG. 1 is a block diagram of an exemplary CDMA cellular telephone system.

FIG. 1 is a block diagram of an exemplary CDMA cellular telephone system 10. The system 10 includes a Mobile Switching Center (MSC) 12 having a Base Station Controller (BSC) 14. A Public Switched Telephone Network (PSTN) 16 routes calls from telephone lines and other networks (not shown) to and from the MSC 12. The MSC 12 routes calls from the PSTN 16 to and from a Source Base Station 18 and a Target Base Station 20 associated with a first cell 22 and a second cell 24, respectively. In addition, the MSC 12 routes calls between the Base Stations 18 and 20. The SBS 18 directs calls to the Mobile Unit 26 within the first cell 22 via a first communications link 28. The communications link 28 may be a two-way link having a forward link 30 and a reverse link 32. When the Base Station 18 has established voice communications with the Mobile Unit 26, the link 28 may be characterized as a traffic channel. Although each Base Station 18 and 20 is associated with only one cell, each may govern or be associated with several cells or sectors.

When the Mobile Unit 26 moves from the first cell 22 to the second cell 24, the Mobile Unit 26 may be handed off to the Target Base Station 20. A handoff may occur in an overlap region 36 where the first cell 22 overlaps the second cell 24.

In a soft handoff, the Mobile Unit 26 establishes a second communications link 34 with the Target Base Station 20 in addition to the first communications link 28 with the Source Base Station 18. After the Mobile Unit 26 has crossed into the second cell 24, it may drop the first communications link 28.

In a hard handoff, when the Mobile Unit 26 moves from the first cell 22 to the second cell 24, the link 28 to the Source Base Station 18 is dropped and a new link is formed with the Target Base Station 20.

According to one embodiment of the present invention, several types of handoff procedures, including the following three handoff procedures, may be accommodated:

Soft handoff, in which the mobile station commences communications with a new base station without interrupting communications with the old base station. Soft handoffs may only be used between CDMA Channels having identical frequency assignments. A soft handoff may provide diversity of forward traffic channels and reverse traffic channel paths on the boundaries between base stations. Soft handoff may be also used during the access process to enhance the system's performance while the mobile station is in access state.

CDMA-to-CDMA hard handoff, in which the mobile station is transitioned between disjoint sets of base stations, different band classes, different Frequency Assignments, or different frame offsets.

CDMA-to-Analog handoff, in which the mobile station is directed from a CDMA traffic channel to an analog traffic channel.

Figure 2:
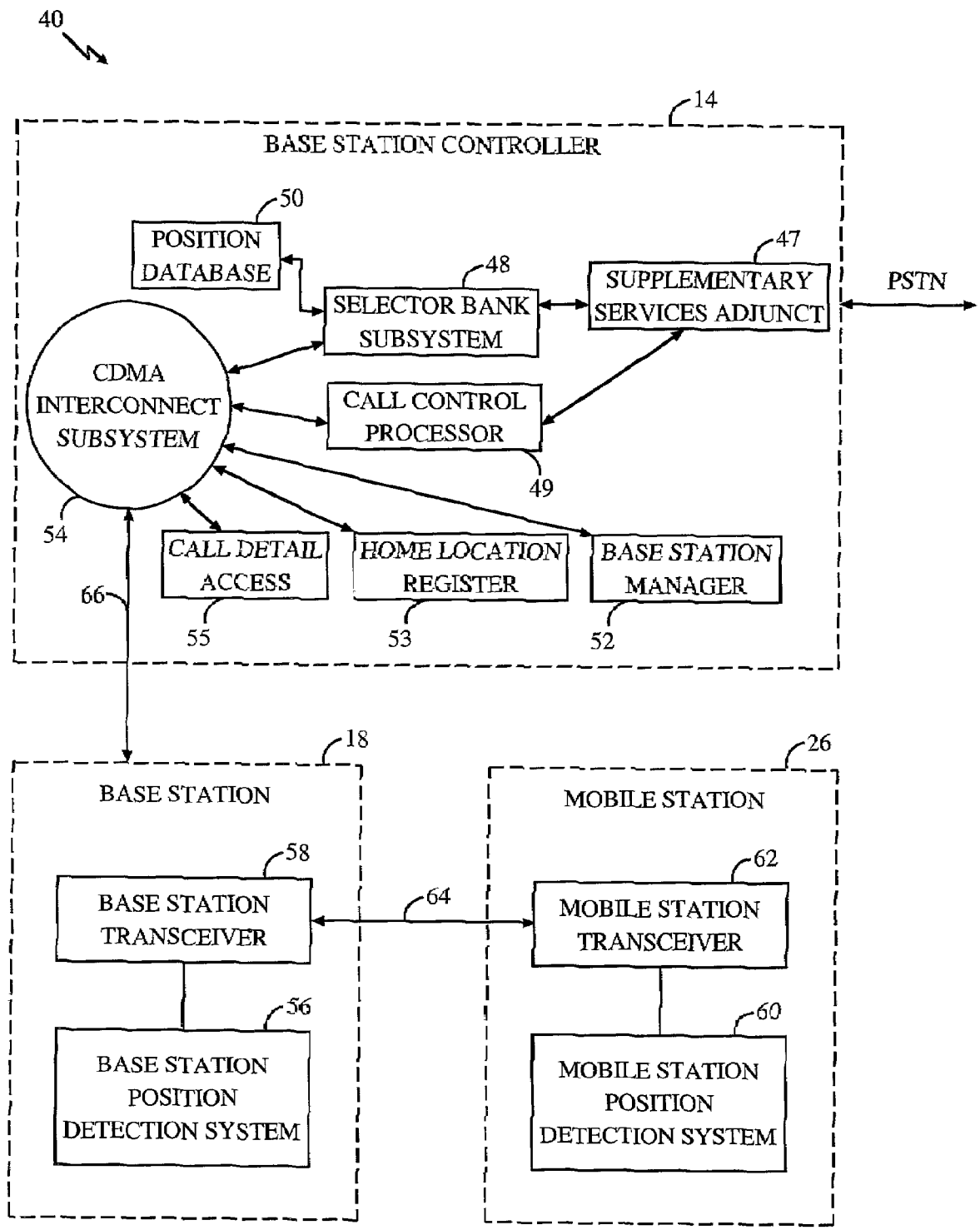
FIG. 2 is a simplified block diagram of a system for facilitating handoff in accordance with one embodiment of the present invention.

FIG. 2 is a block diagram of a system 40 for facilitating handoff in accordance with one embodiment of the present invention. In the present specific embodiment, the system 40 may be configured for use with a CDMA telecommunications system that may include a BSC 14, a Base Station 18 and a Mobile Unit 26. The BSC 14 may include a Selector Bank System (SBS) 48 in communication with a Position Database 50 and a CDMA Interconnect Subsystem 54. The BSC 14 may further include a BSC Position Detection System 46 in communication with the SBS 48. The Base Station 18 may include a Base Station Positional Detection System 56 in communication with a Base Station Transceiver 58. The Mobile Unit 26 may include a Mobile Unit Position Detection System 60 in communication with a Mobile Unit Transceiver 62.

In the present specific embodiment, the Base Station Position Detection System 56, the Mobile Unit Positional Detection System 60, and/or the BSC Position Detection System 46 may include a Global Positioning System (GPS) equipment and the associated computer software modules and interface devices for determining position information of the Mobile Unit 26.

Those skilled in the art will appreciate that other types of position detection technology may be used in addition to or instead of GPS location technology for the purposes of the present invention without departing from the scope thereof.

In one embodiment, after the position of the Mobile Unit 26 is determined via the Base Station Position Detection System 56 and/or the Mobile Unit Position Detection System 60, the position information may be relayed to the BSC 14 via an interface link 66. The position information may be received by the CDMA Interconnect Subsystem 54 and routed to the SBS 48. The SBS 48 may run software routines for monitoring the position of the Mobile Unit 26.

The Position Database 50 may store position information of the telecommunications system coverage areas as well as the optimum handoff and system-access parameters associated with each area. When the Mobile Unit 26 enters a new region, the SBS 48 may send the associated optimum system-access and handoff parameters to the Mobile Unit 26.

In addition, software routines running on the SBS 48 for comparing the current position information of the Mobile Unit 26 to the pre-stored position information in the Position Database 50 may be easily developed and employed by those ordinarily skilled in the art.

The software routines running on the SBS 48 may monitor the position of the Mobile Unit 26 and may determine when a new system-access and handoff parameters are required, e.g. by comparing the received position information with the position information pre-stored in the Position Database 50.

The BSC 14 may also include a Call Detail Access 55, a Home Location Register 53, and a Base Station Manager 52, which may be connected to the CDMA Interconnect Subsystem 54. The Call Detail Access 55 may facilitate keeping billing records for each mobile unit user. The Home Location Register 53 may maintain information about each user and what services they are subscribed to. The Base Station Manager 52 may monitor the overall operation of the BSC 14. Those skilled in the art will appreciate that these elements may be omitted from the system 40 or replaced with other equivalent circuits without departing from the scope of the present invention.

Once the Base Station Position Detection System 56, the Mobile Unit Position Detection System 60, or the BSC Position Detection System 46 determines the current position of the Mobile Unit 26, the associated system-access and handoff parameters are sent to the mobile unit as part of the signaling procedure.

Figure 3:
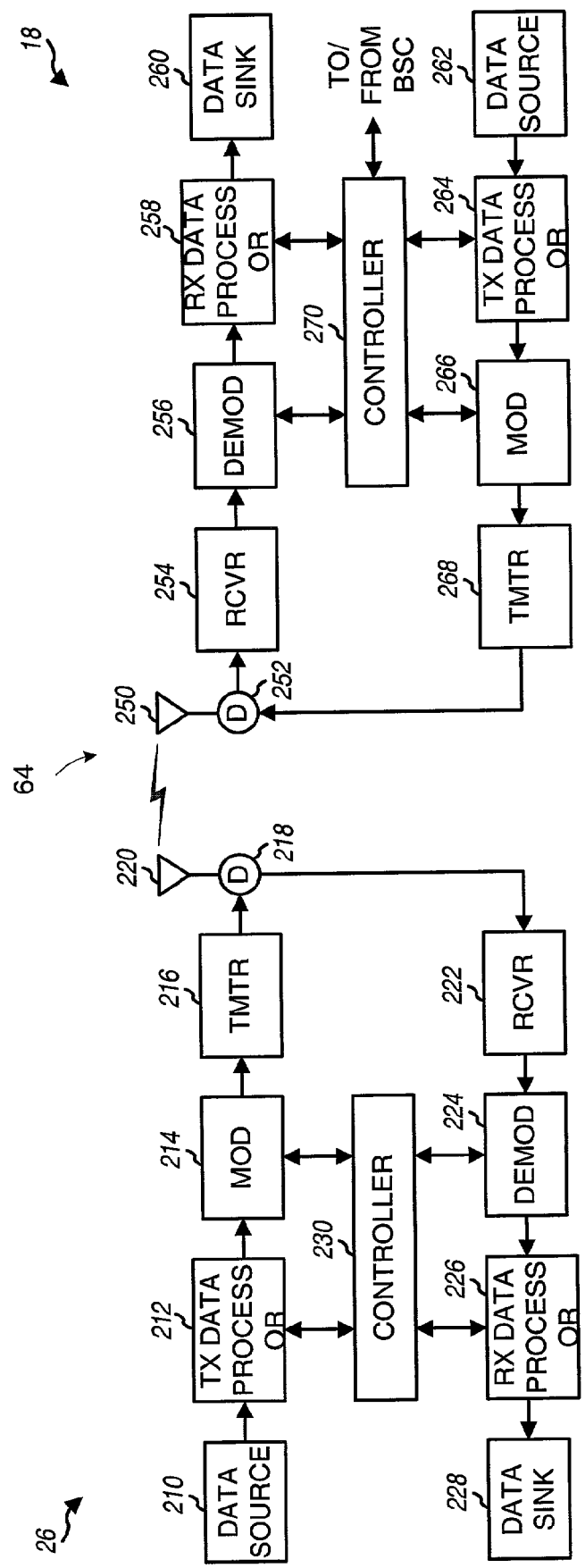
FIG. 3 is a simplified block diagram of an embodiment of a base station and a mobile station.

FIG. 3 shows a simplified block diagram of an embodiment of the Base Station 18 and the Mobile Unit 26 for implementing various aspects of the invention. For a particular communication, voice data, packet data, and/or messages may be exchanged between the Base Station 18 and the Mobile Unit 26, via an air interface 64. Various types of messages may be transmitted, such as messages for establishing a communication session between a base station and a mobile unit and messages for controlling data transmission, e.g., power control, data rate information, and acknowledgment.

For the reverse link, at the Mobile Unit 26, voice and/or packet data, e.g. from a Data Source 210, and messages, e.g. from a Controller 230, may be provided to a Transmitter (TX) Data Processor 212, which may format and encode the data and messages with one or more coding schemes to generate coded data. A coding scheme may include any combination of cyclic redundancy check (CRC), convolutional, turbo, block, and other coding techniques. The voice, data packet, and/or messages may be coded using different schemes, and different types of messages may be coded differently.

The coded data is then provided to a Modulator (MOD) 214 and further processed, e.g., covered, spread with short PN sequences, and scrambled with a long PN sequence assigned to the mobile unit. The modulated data is then provided to a transmitter unit (TMTR) 216 and conditioned, e.g., converted to one or more analog signals, amplified, filtered, and quadrature modulated, to generate a reverse link signal. The reverse link signal may be routed through a Duplexer (D) 218 and transmitted via an antenna 220 to the Base Station 18.

At the Base Station 18, the reverse link signal is received by an antenna 250, routed through a Duplexer (D) 252, and provided to a receiver unit (RCVR) 254. The RCVR unit 254 conditions, e.g. filters, amplifies, down converts, and digitizes the received signal for providing samples. A Demodulator (DEMOD) 256 receives and processes, e.g. despreads, decovers, and pilot demodulates the samples to provide recovered symbols. The DEMOD 256 may implement a rake receiver, which processes multiple instances of the received signal and generates combined symbols. A Receiver (RX) Data Processor 258 then decodes the symbols to recover the data and messages transmitted on the reverse link. The recovered voice and/or packet data may be provided to a Data Sink 260 and the recovered messages may be provided to a Controller 270. Processing by DEMOD 256 and the RX Data Processor 258 is complementary to processing performed at Mobile Unit 26. The DEMOD 256 and the RX Data Processor 258 may further be operated to process multiple transmissions received via multiple channels, e.g. a reverse fundamental channel (R-FCH) and a reverse supplemental channel (R-SCH). Also, transmissions may be simultaneously made from multiple mobile units, each of which may be transmitting on the R-FCH, the R-SCH, or both.

On the forward link, at the Base Station 18, voice and/or packet data, e.g. from a Data Source 262, and messages, e.g. from Controller 270, may be formatted and encoded by a Transmitter (TX) Data Processor 264, covered and spread by a Modulator (MOD) 266, and converted to analog signals, amplified, filtered, and quadrature modulated by a Transmitter Unit (TMTR) 268 to generate a forward link signal. The forward link signal is routed through Duplexer (D) 252 and transmitted via the antenna 250 to the Mobile Unit 26.

At the Mobile Unit 26, the forward link signal is received by the antenna 220, routed through the Duplexer 218, and provided to a the RCVR 222. The RCVR unit 222 conditions, e.g. down converts, filters, amplifies, quadrature modulates, and digitizes the received signal for providing samples. The samples are processed, e.g., despreaded, decovered, and pilot demodulated by a demodulator 224 for providing symbols, and the symbols are further processed, e.g. decoded and checked by a Receive (RX) Data Processor 226 to recover the data and messages transmitted on the forward link. The recovered data is provided to a Data Sink 228, and the recovered messages may be provided to a Controller 230.

An active pilot set is the set of pilot signals that the Mobile Unit 26 is currently or potentially demodulating. If the active pilot set used by the Mobile Unit 26 contains pilot offsets corresponding to the second cell 24 (FIG. 1), the SBS 48 may start tracking the Mobile Unit 26 and initiate a soft handoff when Mobile Unit 26 enters the soft handoff region 36. The BSC 14 may provide instructions for completing handoff to a new MSC coverage area, which may be initiated by the SBS 48 in response to the Mobile Unit 26 being in the soft handoff region 36.

Figure 4:
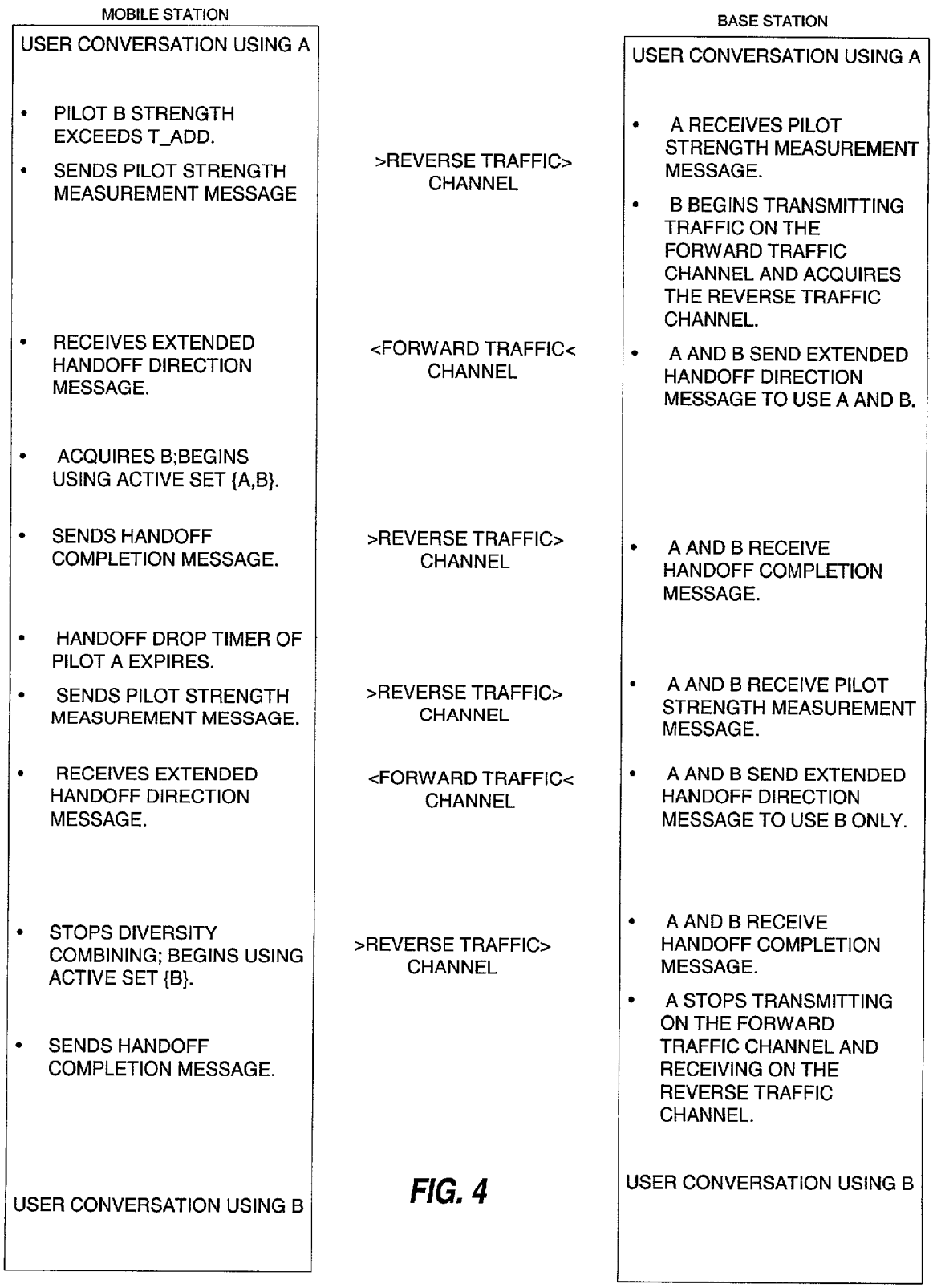
FIG. 4 is a diagram illustrating service negotiation procedures for effecting a soft handoff.

FIG. 4 shows an exemplary call-processing scheme for effectuating a soft handoff from a pilot channel A to a pilot channel B, according to one embodiment of the present invention.

A mobile unit may measure the strength of the pilot channels in the neighboring cells. Pilot energy may be provided in units of decibels. The term pilot refers to a pilot channel identified by a pilot sequence offset, a Walsh or a quasi-orthogonal function, and a frequency assignment. A pilot is associated with the forward traffic channels in the same forward CDMA channel. All pilots associated with the active pilot set have the same CDMA frequency assignment. The mobile unit may search for pilots on the current CDMA frequency assignment to detect the presence of CDMA channels and to measure their energy strengths. When the mobile unit detects a pilot of sufficient strength that is not associated with any of the forward traffic channels assigned to it, it may send a Pilot Strength Measurement Message (PSMM) or Extended Pilot Strength Measurement Message (EPSMM) to the base station. The base station may then assign a forward traffic channel associated with that pilot to the mobile unit and direct the mobile unit to perform a handoff. The parameters for pilot search process and the rules for PSMM or EPSMM transmission may be expressed in terms of the following sets of pilots:

Active set, which includes the set of pilots that are associated with the forward traffic channels assigned to a mobile unit.

Candidate set, which includes the set of pilots that are not currently in the active set, but have been received by the mobile unit, with sufficient strength to indicate that their associated forward traffic channels may be successfully demodulated.

Neighbor set, which includes the set of pilots that are not currently in the active set or the candidate set but are likely candidates for handoff.

Remaining set, which includes the set of all possible pilots in the current system on the current CDMA frequency assignment, excluding the pilots in the neighbor set, the candidate set, and the active set.

The base station may provide the following parameters for searching the above pilot sets:

Search window size for the active set and candidate set "SRCH_WIN_A". The base station may set this parameter field to a window size parameter corresponding to the number of PN chips that the mobile station is to search for pilots in the active set and candidate set.

Search window size for the neighbor set "SRCH_WIN_N". The base station may set this parameter field to a window size parameter corresponding to the number of PN chips that the mobile station is to search for pilots in the neighbor set.

Search window size for the remaining set "SRCH_WIN_R". The base station may set this parameter field to a window size parameter corresponding to the number of PN chips that the mobile station is to search for pilots in the remaining set.

The Mobile Unit 26 may transmit a PSMM or EPSMM to the base stations that are in communication with the Mobile Unit 26. Such messages may include all pilots with energy greater than T-ADD and all members of the current active pilot set whose measured pilot energy values have not fallen below T-DROP for more than a predetermined time period T-TDROP.

A base station may use the pilot strength measurements in a PSMM or EPSMM to determine a new active set. The base station may also use the PN-phase measurements in the PSMM or EPSMM to estimate the propagation delay to the mobile unit. This estimate may be used to reduce reverse traffic channel acquisition time.

In an exemplary embodiment, a mobile unit may generate and transmit a PSMM or EPSMM following the detection of a change in the strength of a pilot under the following three conditions:

1. The strength of a neighbor set or remaining set pilot is found above the threshold T_ADD.

2. The strength of a candidate set pilot exceeds the strength of an active set pilot by more that a threshold T_COMP.

3. The strength of a pilot in the active set has fallen below a threshold T_DROP for more than a predetermined time period T_TDROP.

The parameter T_ADD, pilot detection threshold, may be used by the mobile unit to trigger the transferring of a pilot from the neighbor set or remaining set to the candidate set and to trigger the sending of the PSMM or an EPSMM for initiating the handoff process.

The parameter T_DROP, pilot drop threshold, may be used by the mobile unit to start a handoff drop timer for pilots in the active set and the candidate set.

The parameter T_COMP, active set versus candidate set comparison threshold, may be used by the mobile unit to transmit a PSMM or an EPSMM when the strength of a pilot in the candidate set exceeds that of a pilot in the active set by this margin.

The parameter T_TDROP, drop timer value, is a timer value after which an action is taken by the mobile unit for a pilot that is a member of the active set or candidate set, and whose strength has not become greater than T_DROP. If the pilot is a member of the active set, a PSMM or an ESPMM is issued. If the pilot is a member of the candidate set, it may be moved to the neighbor set.

In an exemplary embodiment, the base stations identified in the PSMM or EPSMM may be identified by their pilot PN sequence offsets, their corresponding measured pilot energy, and/or an indication of whether a pilot should be kept.

In another embodiment of the present invention, the mobile station may monitor the pilot signals, may compile members of each of the above-mentioned sets, i.e., active set, candidate set, and neighbor set, and may determine whether a change to the current active set is desirable according to the following linear relationships:

$$Y1 = SOFT\_SLOPE * COMBINED\_PILOT + ADD\_INTERCEPT \qquad (1)$$

$$Y2 = SOFT\_SLOPE * COMBINED\_PILOT + DROP\_INTERCEPT \qquad (2)$$

Figure 5:
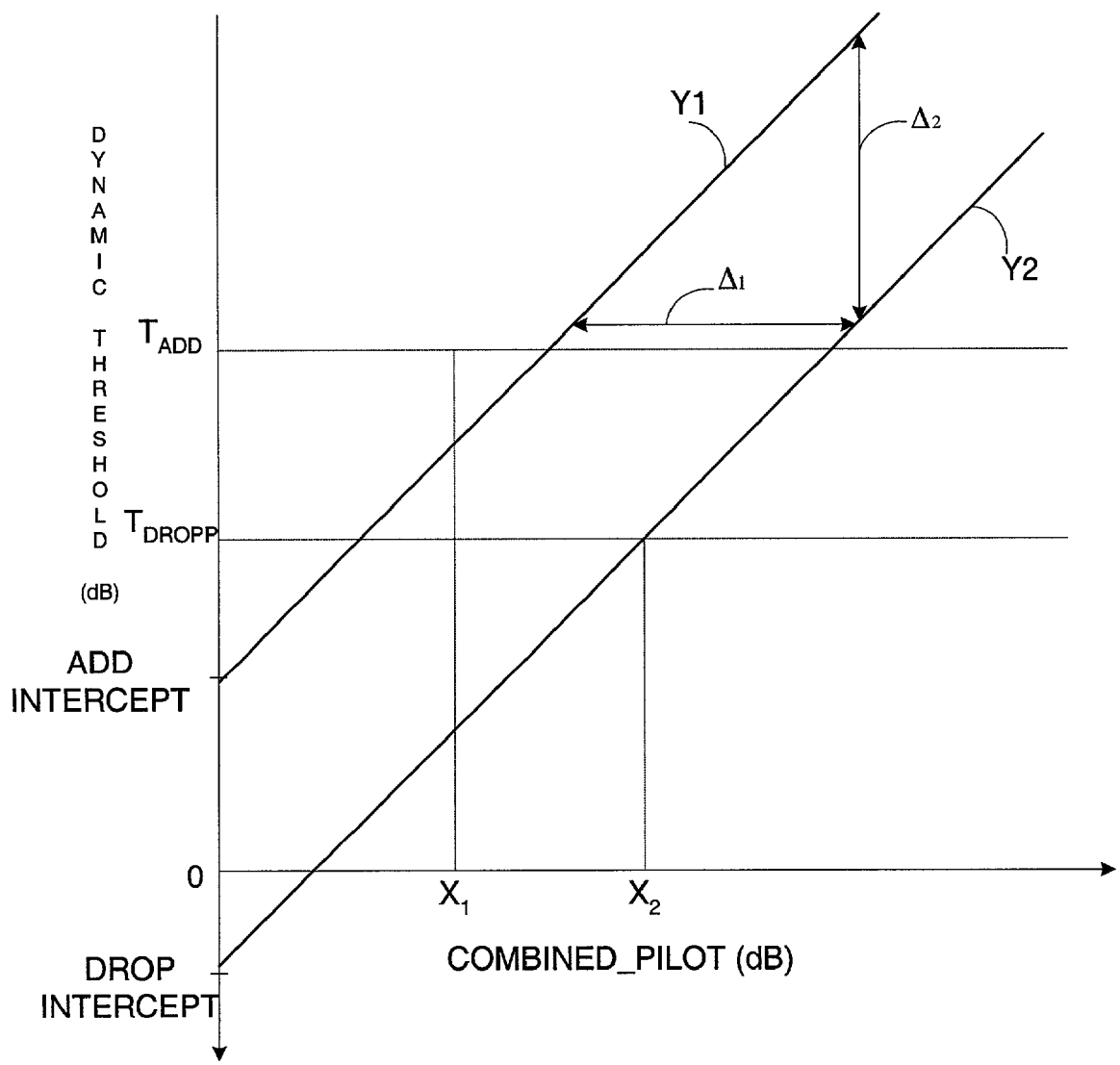
FIG. 5 is a diagram showing a set of soft handoff parameters.

FIG. 5 shows a graphical representation of the relationships (1) and (2). The dynamic thresholds Y1 and Y2 may be plotted as functions of combined pilot energy (i.e. Ec/Io), which may be in dB. As can be seen, both Y1 and Y2 are linear functions with a slope of SOFT_SLOPE and respective y-intercepts of ADD_INTERCEPT and DROP_INTERCEPT.

Y1 is the dynamic threshold above which a candidate set pilot's measured energy should rise before the mobile unit may request adding it to the revised active set, and Y2 is the dynamic threshold below which an active set pilot's energy should fall before the mobile unit may request moving it from the active set to the candidate set.

The parameter SOFT_SLOPE is the slope in the inequality criterion for adding a pilot to the active set. The parameters ADD_INTERCEPT and DROP_INTERCEPT are the y-intercepts in the inequality criterion for adding or dropping a pilot to or from the active set, respectively.

From the relationships (1) and (2), it may be seen that if the measured energy of a particular active set pilot falls below Y2, the pilot may be moved to the candidate set. In order for the same pilot to be added back into the revised active set, one of two things may happen: either the value of COMBINED_PILOT decreases by some amount Δ1, or that pilot's own measured energy increases by some amount Δ2. Thus, it may be seen that Δ1 and Δ2 are the hysteresis values of the COMBINED_PILOT and individual pilot energy, respectively, and they may be needed to prevent a given pilot from being repeatedly moving in and out of the active set.

Thus, pilots may be added to the revised active set when the COMBINED_PILOT value is less than or equal to X1, and may be dropped from the active set when the COMBINED_PILOT value is greater than or equal to X2. From the relationships (1) and (2), it may be shown that:

$$SOFT\_SLOPE = \Delta 2/\Delta 1; \quad (3)$$

$$DROP\_INTERCEPT = T\_DROP - X2 * \Delta 2/\Delta 1; \text{ and} \quad (4)$$

$$ADD\_INTERCEPT = DROP\_INTERCEPT + \Delta 2. \quad (5)$$

A base station may send messages on the common control channels or dedicated control channels to a mobile unit for governing the access process, pilot search, the mobile unit's performance, and/or soft handoff procedures.

The base stations in communication with the mobile unit may respond to the PSMM or EPSMM that they have received from the mobile unit by sending an Extended Handoff Direction Message, a General Handoff Direction Message, or a Universal Handoff Direction Message, as illustrated in FIG. 4.

According to another embodiment, the base station may modify the values of the parameters SRCH_WIN_A, T_ADD, T_DROP, T_COMP, and T_TDROP through the Extended Handoff Direction Message, the General Handoff Direction Message, or the Universal Handoff Direction Message. In addition, the base station may also modify the values of the parameters SRCH_WIN_N, SRCH_WIN_R, SOFT_SLOPE, ADD_INTERCEPT, and DROP_INTERCEPT through the General Handoff Direction Message or the Universal Handoff Direction Message.

According to one embodiment of the present invention, the soft handoff parameters may be optimized based on the position information about the location of the Mobile Unit 26. When the Mobile Unit 26 moves into a new sector or cell, a location server or an entity may determine the geographical characteristics of the mobile unit's location, including its longitude and latitude, and forward such position information to the BSC 14 (FIG. 2). The SBS 48 (FIG. 2) may use the position information of the Mobile Unit 26 to find a set of optimum system-access and handoff parameters from the Position Database 50 (FIG. 2). According to one embodiment of the present invention, the Position Database 50 may contain a look up table that relates the handoff parameters to position information about the location of the Mobile Unit 50 in a cell or sector. The Base Station 18 may forward the optimum set of handoff parameters to the Mobile Unit 26 when the mobile unit is in control of the traffic channel, as will be described below.

Figure 6:
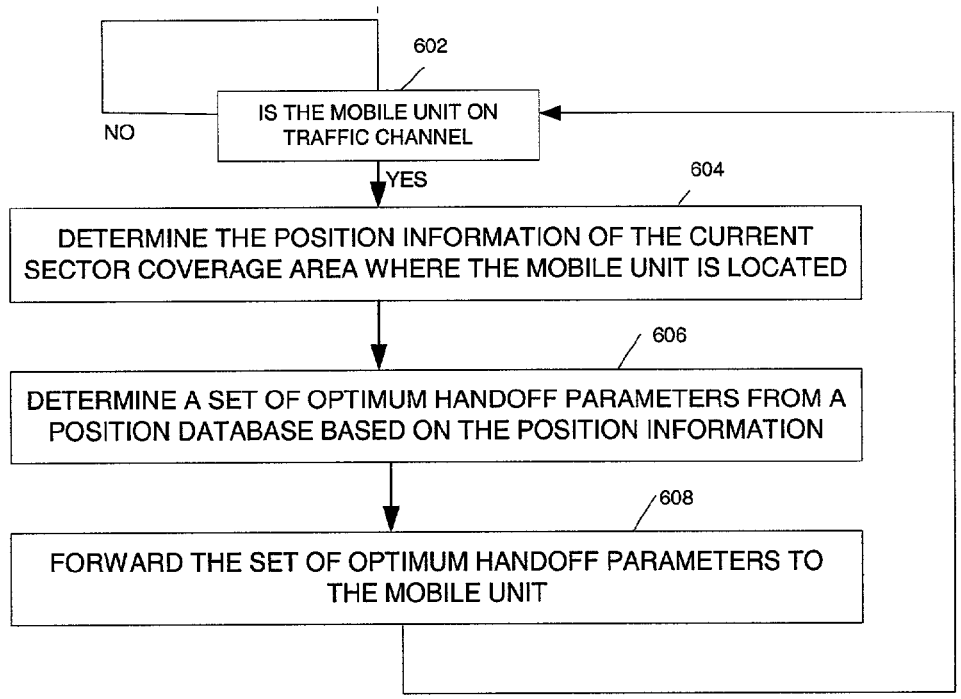
FIG. 6 is a flow chart showing a soft-handoff parameter optimization process in accordance with the present invention.
Figure 7:
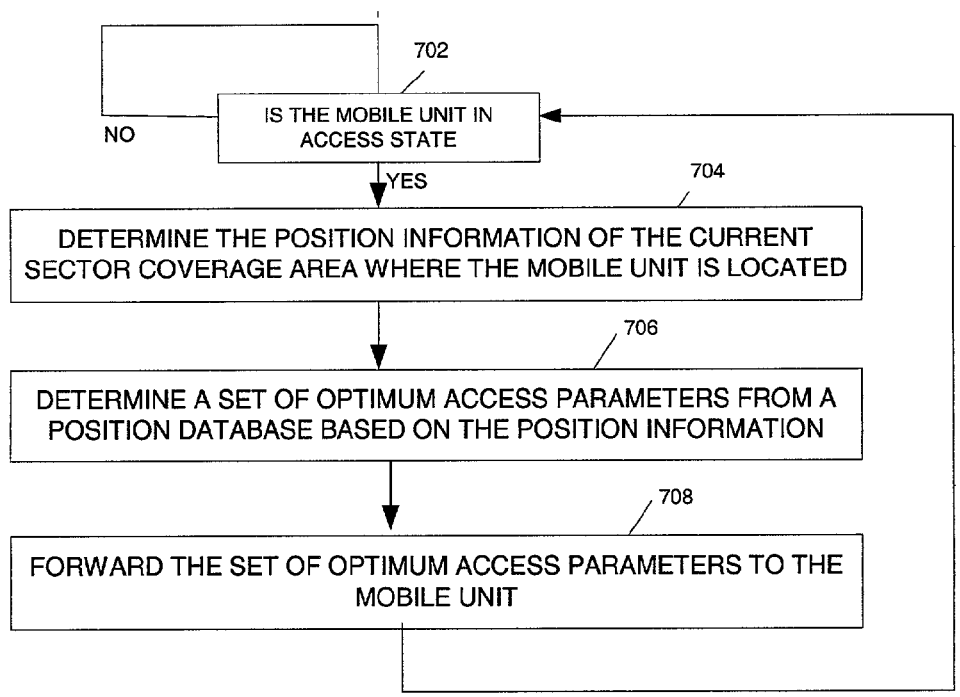
FIG. 7 is a flow chart showing an access parameter optimization process in accordance with the present invention.

FIG. 6 shows a flow chart for an exemplary soft-handoff parameter optimization process, and FIG. 6 shows a flow chart for an exemplary access parameter optimization process, according to one embodiment of the invention.

When the mobile unit is on the traffic channel, i.e., in two-way conversation, as determined in step 602, the position information of the current sector coverage area of the mobile unit may be determined in step 604. An optimum set of handoff parameters corresponding to the position information of the current sector coverage area may be obtained, e.g., from the Position Database 50, in step 606. Then, the optimum parameters may be forwarded to the mobile unit in step 608. The base station may revise the system-access and handoff parameters in the mobile unit that is operating on the traffic channel by sending the parameters in the in-traffic system parameters message. This parameter optimization technique may be applied at sector level to update the system-access and soft handoff parameters in the mobile unit at micro level, making the handoff procedures more sensitive to the geographical characteristics of the mobile unit. Consequently, a handoff may be more readily facilitated based on optimum handoff parameters, which advantageously prevents call dropouts and poor service performance during handoffs in high traffic area, congested urban environments, and/or when moving or making sharp turns around tall buildings.

In one embodiment of the present invention, mobility of a mobile unit may be restricted to a predetermined coverage area, which may include a cell or a sector. When the mobile unit's position information indicates that the mobile unit has entered a restricted area, the base station controller may send a set of parameters to the mobile unit that causes the mobile unit to loose its access and not to be able to perform or establish a communication link in the restricted zone.

In one embodiment, the method and system disclosed herein dynamically updates a current set of system-access and/or soft-handoff parameters is based on the recent performance of mobile stations that have traversed a given geographical areas. For example, an intelligent system may deduce that a mobile station that traveled the same route that the mobile station is about to travel went through unnecessary handoff, which could have been avoided without major degradation in system's performance. The intelligent system may also deduce that the mobile station at the same geographical areas accessed the system with much higher and unnecessary transmit power based on open loop calculations, hence the mobile unit under consideration may use less initial power for accessing the system. Intelligent systems are well known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication system comprising:
   a first transceiver;
   a second transceiver;
   a third transceiver in communication with the first transceiver; and
   a controller configured to effectuate a soft handoff from the first transceiver to the second transceiver using a set of optimum parameters that are determined based on a current position of the third transceiver, wherein the set of optimum parameters includes a set of optimum system-access parameters that are used when a mobile unit comprising the third transceiver is operating in a system access state.

2. The system of claim 1 wherein the controller is further configured to determine the current position of the third transceiver.

3. The system of claim 2, wherein the current position includes a position of a sector within a cell coverage area.

4. The system of claim 1 wherein the set of optimum parameters also includes a set of optimum soft-handoff parameters.

5. The system of claim 4 wherein the controller is further configured to determine the set of optimum soft-handoff parameters.

6. The system of claim 1, wherein the controller is further configured to determine the set of optimum system-access parameters.

7. A mobile unit comprising:
   a receiver unit configured to receive a set of optimum system-access parameters determined based on a current position of the mobile unit, wherein the optimum system-access parameters are used when the mobile unit is operating in a system access state; and
   a controller configured to effectuate a soft handoff of the mobile unit based on the received set of optimum system-access parameters.

8. A mobile unit comprising:
   a receiver unit configured to receive a set of optimum system-access parameters and a set of optimum soft-handoff parameters determined based on a current position of the mobile unit, wherein the optimum system-access parameters are used when the mobile unit is operating in a system access state; and
   a controller configured to effectuate a soft handoff from a first base station to a second base station based on the received set of optimum soft-handoff parameters.

9. The mobile unit of claim 8 wherein the controller is further configured to determine the current position of the mobile unit.

10. The mobile unit of claim 9 wherein the current position includes a position of a sector within the cell coverage area.

11. The mobile unit of claim 8, further comprising means for controlling the performance of the mobile unit based on the received set of optimum system access parameters.

12. A base station comprising:
   a transmitter unit configured to transmit a set of optimum system-access parameters determined based on a current position of a mobile unit; and
   a controller configured to effectuate a soft handoff of the mobile unit based on the set of optimum system-access parameters, wherein the optimum system-access parameters are used when the mobile unit is operating in a system access state.

13. A base station comprising:
   a transmitter unit configured to transmit to the mobile unit a set of optimum system-access parameters and a set of optimum soft-handoff parameters determined based on a current position of the mobile unit in a first coverage area; and
   a controller configured to effectuate a soft handoff from the first coverage area to a second coverage area based on the set of optimum soft-handoff parameters and to use the optimum system-access parameters when the mobile unit is operating in a system access state.

14. The base station of claim 13 wherein the controller is further configured to determine the current position of the mobile unit in the first coverage area.

15. The base station of claim 13 wherein the first coverage area includes a sector within the cell coverage area.

16. The base station of claim 13 wherein the controller is further configured to determine the set of soft-handoff parameters.

17. The base station of claim 13, wherein the controller is further configured to determine the set of optimum soft-handoff parameters and the set of optimum system-access parameters.

18. A method for effectuating soft handoff, comprising:
   determining a current position of a mobile unit in a first coverage area;
   determining a set of optimum parameters based on the current position of the mobile unit; and
   effectuating a soft handoff from the first coverage area to a second coverage area using the set of optimum parameters, wherein the set of optimum parameters includes a set of optimum system-access parameters that are used when the mobile unit is operating in a system access state.

19. The method of claim 18 wherein the set of optimum parameters also includes a set of optimum soft-handoff parameters.

20. The method of claim 19, further comprising transmitting the set of optimum system-access parameters and the set of optimum soft-handoff parameters to the mobile unit in an in-traffic system parameters message.

21. The method of claim 19, further comprising determining the set of optimum system-access parameters and the set of optimum soft-handoff parameters when the mobile unit moves into a new coverage area.

22. The method of claim 21, wherein determining the set of optimum system-access parameters and the set of optimum soft-handoff parameters comprises accessing a position database that stores position information about various coverage areas, and that also stores optimum system-access and soft-handoff parameters associated with each coverage area.

23. A computer-program product for effectuating soft handoff, the computer-program product comprising a computer-readable medium having instructions thereon, the instructions comprising:
   code for determining a current position of a mobile unit in a first coverage area;
   code for determining a set of optimum parameters based on the current position of the mobile unit; and
   code for effectuating a soft handoff from the first coverage area to a second coverage area using the set of optimum parameters, wherein the set of optimum parameters includes a set of optimum system-access parameters that are used when the mobile unit is operating in a system access state.

24. An apparatus for effectuating soft handoff, comprising:
   means for determining a current position of a mobile unit in a first coverage area;
   means for determining a set of optimum parameters based on the current position of the mobile unit; and
   means for effectuating a soft handoff from the first coverage area to a second coverage area using the set of optimum parameters, wherein the set of optimum parameters includes a set of optimum system-access parameters that are used when the mobile unit is operating in a system access state.

25. An apparatus for effectuating soft handoff, comprising:
   a memory unit; and
   a digital signal processing (DSP) unit communicatively coupled to the memory unit, the DSP being capable of:
   determining a current position of a mobile unit in a first coverage area;
   determining a set of optimum parameters based on the current position of the mobile unit; and
   effectuating a soft handoff from the first coverage area to a second coverage area using the set of optimum parameters, wherein the set of optimum parameters includes a set of optimum system-access parameters that are used when the mobile unit is operating iii a system access state.

* * * * *

UNITED STATES PATENT AND TRADEMARK OFFICE
CERTIFICATE OF CORRECTION

PATENT NO. : 7,680,497 B2  
APPLICATION NO. : 09/965187  
DATED : March 16, 2010  
INVENTOR(S) : Soliman It is certified that error appears in the above-identified patent and that said Letters Patent is hereby corrected as shown below:

Column 12, line 34, claim 10: "the cell coverage" to read as --a cell coverage--

Column 12, line 50, claim 13: "the mobile unit" to read as --a mobile unit--

Column 12, line 64, claim 15: "the cell coverage" to read as --a cell coverage--

Column 14, line 34, claim 25: "iii" to read as --in--

Signed and Sealed this  
Twenty-seventh Day of September, 2011

David J. Kappos  
*Director of the United States Patent and Trademark Office*